(12) United States Patent
Arai et al.

(10) Patent No.: US 6,469,921 B2
(45) Date of Patent: Oct. 22, 2002

(54) POWER SUPPLY APPARATUS

(75) Inventors: Toru Arai, Kyoto (JP); Tetsuro Ikeda, Osaka (JP); Goro Nakano, Sanda (JP); Hideo Ishii, Minoo (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 0 days.

(21) Appl. No.: 09/813,384

(22) Filed: Mar. 21, 2001

(65) Prior Publication Data

US 2001/0024377 A1 Sep. 27, 2001

(30) Foreign Application Priority Data

Mar. 21, 2000 (JP) ......................................... 2000-077535

(51) Int. Cl.[7] .............................. H02M 3/24; G05F 3/06
(52) U.S. Cl. ......................................... 363/98; 323/308

(58) Field of Search .............................. 363/98, 17, 143, 363/40, 86, 144, 45; 323/308, 331, 334; 336/174

(56) References Cited

U.S. PATENT DOCUMENTS 3,777,248 A * 12/1973 Vermolen ..................... 363/22
4,766,365 A * 8/1988 Boldue et al. ............... 323/308

* cited by examiner

*Primary Examiner*—Rajnikant B. Patel
(74) *Attorney, Agent, or Firm*—Duane Morris LLP

(57) ABSTRACT

A DC voltage from a DC supply is applied to inverters of two power supply units connected in parallel with each other. The inverters convert the received DC voltages into high-frequency voltages, which are, in turn, voltage-transformed in transformers. The outputs of the transformers are rectified in two rectifiers, respectively, and smoothed in two reactors. The smoothed voltages are supplied between output terminals. The reactors are formed on a single core, being loosely coupled with each other.

5 Claims, 4 Drawing Sheets

POWER SUPPLY APPARATUS

The present invention relates to a power supply apparatus including a plurality of power supply units connected in parallel with each other.

BACKGROUND OF THE INVENTION

Such power supply apparatus has been used in such a case that a single power supply unit cannot supply the power required by a load. Such power supply apparatus includes a plurality, for example, two, of power supply units to which a DC voltage is applied from a DC power source. The DC voltage is converted into a high-frequency voltage in inverters of the respective power supply units. The high-frequency voltages are then voltage-transformed in transformers, and rectified in respective rectifiers. The rectified voltages are smoothed by smoothing reactors. The smoothed voltages are developed between output terminals for application to a load. Currents supplied by the respective power supply units to the load are detected by control units of the power supply units, and the inverters are individually controlled by the associated control units in such a manner as to make the load current equal to a predetermined value.

The reactors are used to smooth the outputs of the rectifiers. Also, the reactors absorb a voltage difference between the output voltages of the inverters which would be caused when the inverters are controlled differently from each other. Such reactors each include a core and are large in size, which makes it impossible to downsize power supply apparatuses.

An object of the present invention is to make improvements to a reactor to thereby provide a parallel-type power supply apparatus having a small size.

SUMMARY OF THE INVENTION

A power supply apparatus according to the present invention includes at least two power supply units. Each unit includes a DC-to-high-frequency converter which receives a DC voltage and converts the received DC voltage to a high-frequency voltage. A transformer in each power supply unit voltage transforms the high-frequency voltage, and a rectifier rectifies the output voltage of the transformer. A reactor in each unit smoothes the rectifier output. The power supply units have their inputs connected in parallel with each other and connected to a DC source providing the DC voltage, and have their outputs connected in parallel with each other and to a load. The reactors have their windings loosely coupled with each other on a single core.

The core may have a center part, and at least two outer legs which are disposed on opposite sides of the center part and extend along the length of the center part. Each of the outer legs has a gap in it, and reactor windings are wound on the outer legs.

The gaps in the legs can be formed at locations corresponding to substantially the midpoint of the center part. In this case, the core is formed of two like members which are located on opposite sides of a plane passing through the gaps and the center part.

The core may include first, second and third members. Each of the first and second members has a center leg and at least two outer legs. The center legs of the first and second members have the same length. The outer legs of each member are disposed on opposite sides of the center leg, being spaced from the center leg, and have the same length as the center leg. The third member is interposed between the center legs of the first and second members so that the corresponding outer legs of the first and second members can face each other with a spacing disposed between them.

The DC-to-high-frequency converters of the power supply units may be controlled by a common control signal provided by a control unit common to the power supply units.

The common control unit may include detecting means for detecting an output signal coupled to the load, an error detecting means for detecting the difference between the output signal and a predetermined reference signal and develops an error signal representative of the detected difference, and control signal generating means for generating the common control signal based on the error signal. The output signal detecting means may detect current, voltage or power provided for the load. Alternatively, the output signal detecting means may be so arranged as to detect both current and voltage supplied to the load, and the error detecting means may be so arranged as to detect the difference between the detected current and a predetermined reference value and the difference between the detected voltage and a predetermined reference value.

Current detecting means may be used to detect current supplied by each of the DC-to-high-frequency converters to its associated transformer. Comparing means is associated with each current detecting means for comparing the current detected by that current detecting means with a reference signal representative of current to be supplied by that DC-to-high-frequency converter. Interrupting means is used to interrupt the coupling of the common control signal to the DC-to-high-frequency converter which supplies current, as detected by the current detecting means, greater than the reference signal.

DETAILED DESCRIPTION OF THE INVENTION

Figure 1:
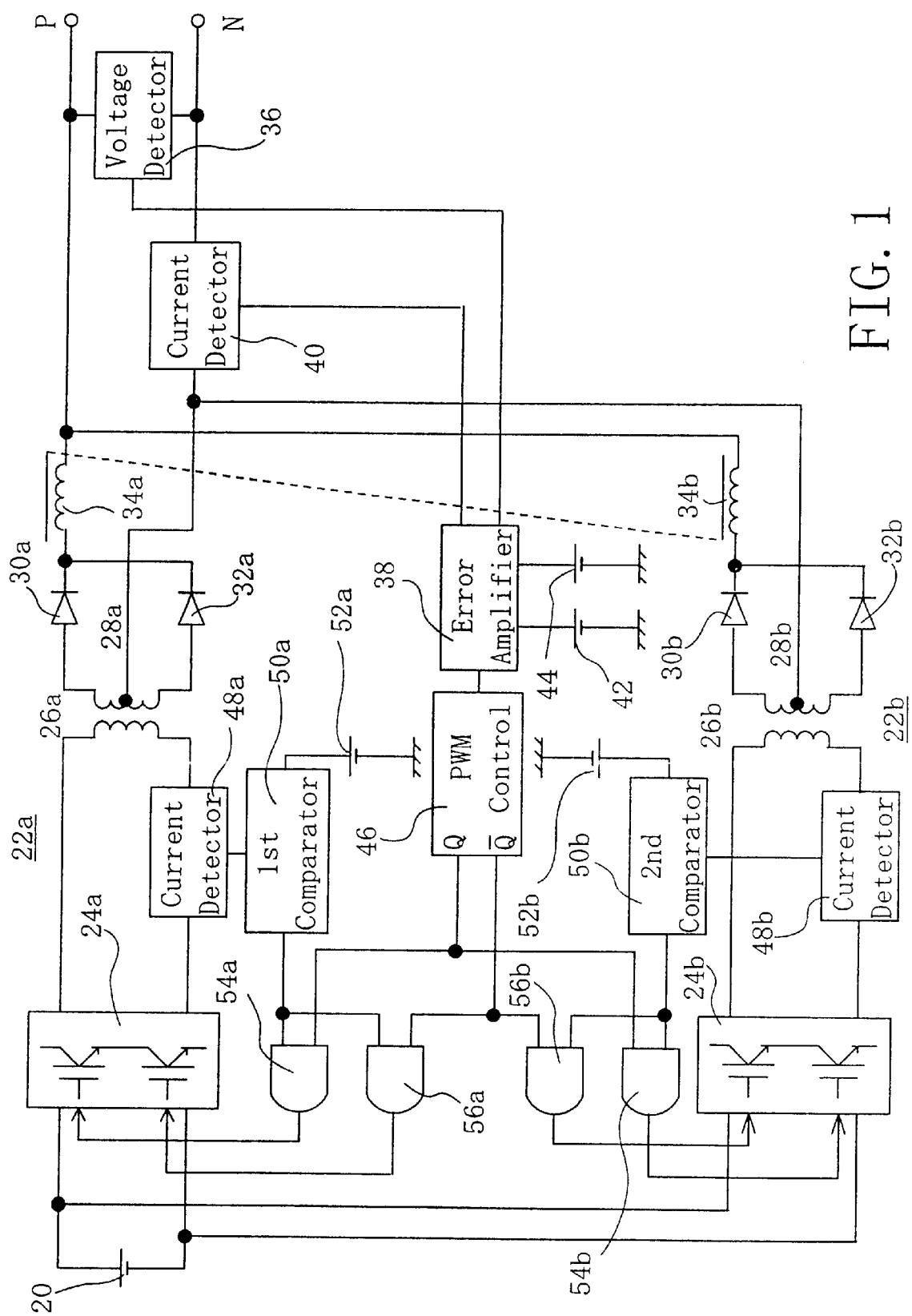
FIG. 1 is a block diagram of a power supply apparatus embodying the present invention.

A power supply apparatus according to an embodiment of the present invention includes a DC power supply 20, as shown in FIG. 1. The DC power supply 20 may be arranged to provide a DC voltage by, for example, rectifying an AC voltage from a single-phase or three-phase commercial AC voltage source and smoothing the resulting DC voltage by means of a rectifier and a smoothing circuit. The DC voltage from the DC power supply 20 is applied to a power supply units 22a and 22b.

The power supply unit 22a has a DC-to-high-frequency converter, e.g. an inverter 24a, to which the DC voltage is applied from the DC power supply 20. The inverter 24a includes semiconductor switching devices which are rendered conductive while it is supplied with a control signal. The semiconductor switching devices may be bipolar transistors, power FETs or power IGBTs. The semiconductor switching devices are bridge-connected. For example, two semiconductor switching devices are connected into a half-bridge configuration. Alternatively, four semiconductor switching devices can be connected into a full-bridge configuration. The conduction periods of the respective semiconductor switching devices being controlled by a control signal, the inverter 24a converts the DC voltage into a high-frequency voltage.

The high-frequency voltage is applied to a primary winding of a transformer 26a, which causes a voltage-transformed, e.g. lowered, high-frequency voltage to be induced in a secondary winding of the transformer 26a. The voltage-transformed, high-frequency voltage is rectified in a rectifier 28a, which includes rectifying diodes 30a and 32a. The diodes 30a and 32a have their anodes connected to the respective ends of the secondary winding of the transformer 26a, and have their cathodes connected together. The output rectified voltage is developed between the junction of the cathodes and an intermediate tap on the secondary winding. The output voltage is smoothed by a smoothing reactor 34a, and the smoothed output voltage is developed between output terminal P and N of the apparatus.

The other power supply unit 22b is constructed similarly to the power supply unit 22a. Accordingly, the same reference numerals with a suffix "b" attached to them are used for components and functions similar to the ones described with reference to the power supply units 22a, and no detailed description is given.

The voltage appearing between the output terminals P and N, i.e. the voltage supplied by the power supply units 22a and 22b, is detected by an output voltage detector 36. The output voltage detector 36 develops an output-voltage representative signal representing the voltage developed between the output terminals P and N, which is applied to an error amplifier 38.

The current supplied from the power supply units 22a and 22b to the load (not shown), i.e. the sum of the currents supplied to the load from the power supply units 22a and 22b, is detected by an output current detector 40. The output current detector 40 develops an output-current representative signal representing the current it detects. The output-current representative signal is also coupled to the error amplifier 38.

The error amplifier 38 develops a voltage error signal representative of the difference between the output-voltage representative signal from the output voltage detector 36 and a reference voltage signal supplied from a reference voltage signal source 42, and also develops a current error signal representative of the difference between the output-current representative signal and a reference current signal supplied from a reference current signal source 44. The voltage. and current error signals are supplied to a PWM (pulse width modulation) control unit 46.

The PWM control unit 46 controls the inverters 24a and 24b based on the error signals in such a manner as to make the output voltage and the output current equal to respective predetermined values. For that purpose, the PWM control unit 46 produces two PWM control signals Q and $\overline{Q}$. The PWM control signal Q controls the conduction period of corresponding ones of the semiconductor switching devices of the inverters 24a and 24b. The PWM control signal $\overline{Q}$ controls the conduction period of other corresponding ones of the semiconductor switching devices of the inverters 24a and 24b.

Thus, the two inverters 24a and 24b are controlled by the control signals common to the inverters 24a and 24b which are supplied from common control means formed of the output-voltage detector 36, the output-current detector 40, the error amplifier 38, the PWM control unit 46 etc. Because of the use of the common control signals for controlling the inverters 24a and 24b, the two inverters 24a and 24b are ON-OFF controlled in synchronization with each other, whereby the two power supply units 22a and 22b can equally share the output current. In other words, each of the power supply units 22a and 22b supplies one-half of the output current.

The primary currents supplied from the inverters 24a and 24b to the transformers 26a and 26b, respectively, are detected by primary current detectors 48a and 48b, respectively. A primary-current representative signal developed by the primary current detector 48a is applied to a first comparator 50a, and a primary-current representative signal developed by the primary current detector 48b is applied to a second comparator 50b. The first and second comparators 50a and 50b receive primary current reference signals from primary current reference signal sources 52a and 52b, respectively. The primary current reference signal represents a value $1_{do}/2n$, where $1_{do}$ is the current which essentially should be supplied to the load, and n is the ratio in number of turns of the primary winding to the secondary winding of the transformers 26a and 26b. Thus, the value $1_{do}/2n$ is the value of the current which essentially flows in the primary side of each of the power supply units 22a and 22b when the current $1_{do}$ is flowing in the load.

Each of the first and second comparators 50a and 50b produces an output signal of logic "1" when the primary-current representative signal is equal to or smaller than the primary current reference signal, and produces an output signal of logic "0" when the primary-current representative signal is larger than the primary current reference signal.

The output signal of the first comparator 50a is coupled to AND gates 54a and 56a. The AND gates 54a and 56a receive also the PWM control signals Q and $\overline{Q}$, respectively, from the PWM control unit 46. Output signals of the AND gates 54a and 56a are coupled to the semiconductor switching devices of the inverter 24a.

Similarly, the output signal of the second comparator 50b is coupled to AND gates 54b and 56b. The AND gates 54b and 56b receive also the PWM control signals Q and $\overline{Q}$, respectively, form the PWM control unit 46. Output signals of the AND gates 54b and 56b are coupled to the semiconductor switching devices of the inverter 24b.

Accordingly, when the power supply units 22a and 22b each supply equally a current of $1_{do}/2n$, both first and second comparators 50a and 50b produce the logic "1" output signal, whereby all of the gates 54a, 54b, 56a and 56b open. Therefore, the PWM control signals Q and $\overline{Q}$ from the PWM control unit 46 are supplied to both inverters 24a and 24b.

When the shares of current of the power supply units 22a and 22b become unequal, for example, when the share of the power supply unit 22a becomes larger, the first comparator 50a produces the logic "0" output signal, which causes the gates 54a and 56b to be closed. Accordingly, no PWM control signals are supplied to the inverter 24a, and, therefore, the inverter 24a stops operating. This causes the share of the current of the inverter 24b to increase.

Figure 2:
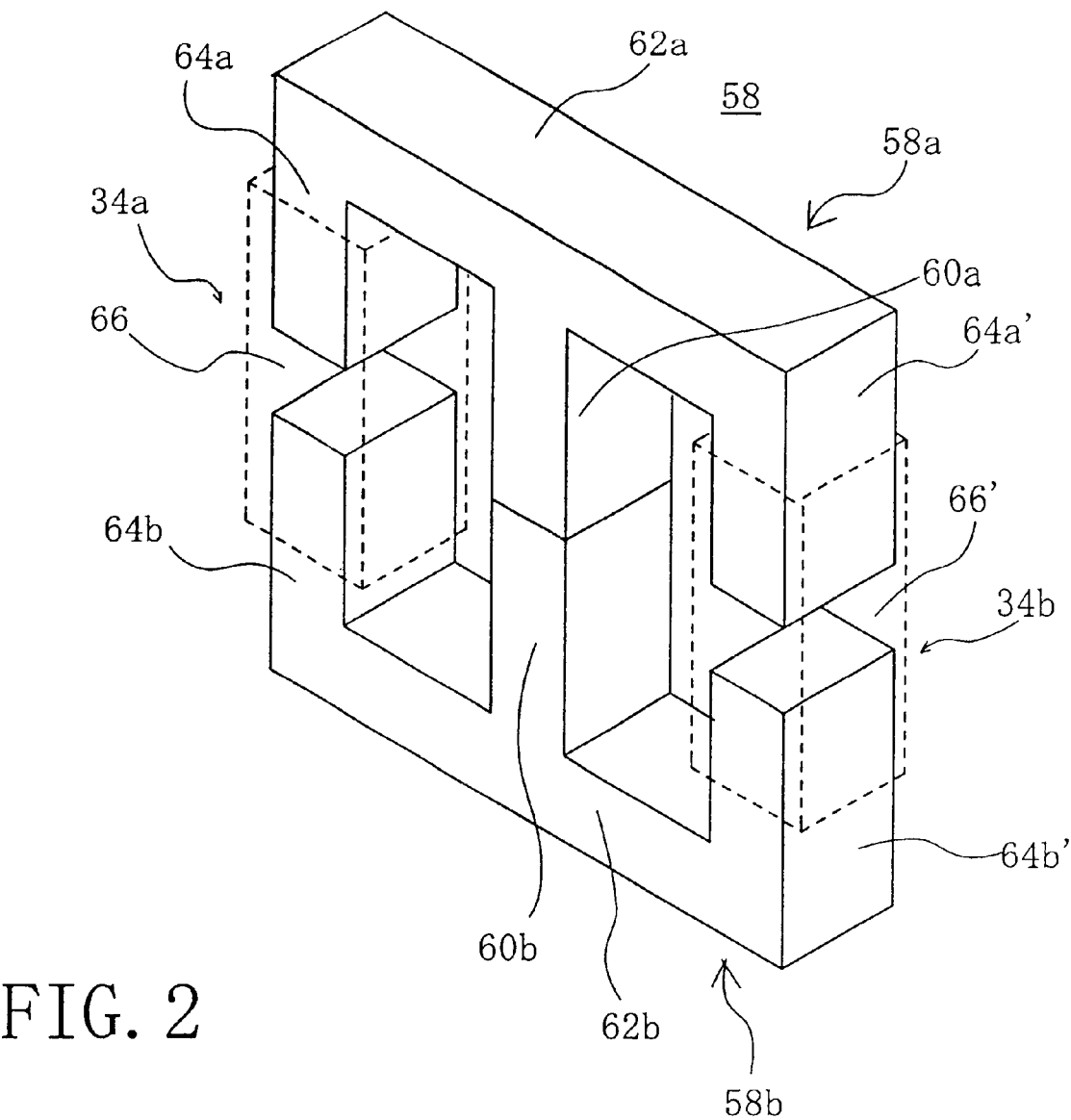
FIG. 2 is a perspective view of a reactor used in the power supply apparatus shown in FIG. 1.

The reactors 34a and 34b are formed on a single core 58, as shown in FIG. 2. The core 58 is formed of first and second members 58a and 58b having the same shape and size. The core 58a and 58b have center parts, e.g. center legs 60a and 60b, respectively. Horizontal arms 62a and 62b horizontally extend with their center portions connected to respective one ends of the center legs 60a and 60b. From the opposite ends of the horizontal arm 62a, outer legs 64a and 64a' extend along the length direction of the center leg 60a, and from the opposite ends of the horizontal arm 62b, outer legs 64b and 64b' extend along the length direction of the center leg 60b.

The center legs 60a and 60b have the same length, and the outer legs 64a, 64a', 64b and 64b' have the same length. The length of the outer legs 64a, 64a', 64b and 64b' is smaller than the length of the center legs 60a and 60b. The first and second members 58a and 58b are disposed in such a manner that the end surfaces of the outer legs 64a and 64a' face to the end surfaces of the outer legs 64b and 64b' respectively, with the end surfaces of the center legs 60a and 60b contacting each other. Thus, a gap 66 is formed between the outer legs 64a and 64b, and a gap 66' is formed between the outer legs 64a' and 64b'. The horizontal plane of contact between the end surfaces of the center legs 60a and 60b passes through the gaps 66 and 66'.

Windings providing the reactors 34a and 34b are wound, as indicated by dashed lines, on the core 58 having the gaps 66 and 66'. More specifically, the windings are wound on the facing outer legs 64a and 64b with the gap 66 disposed therebetween and on the facing outer legs 64a' and 64b' with the gap 66 disposed therebetween, to cover portions of the facing outer legs 64a and 64b and 64a and 64a' including the respective gaps 66 and 66'. With this arrangement, although the reactors 34a and 34b are formed on the single core 58, they are coupled loosely.

Because of the loose coupling between the reactors 34a and 34b, they can be operated individually, and, also they can be made small in size.

Furthermore, since the first and second core members 58a and 58b are of the same shape and size, the number of steps required for manufacturing the reactors can be smaller than when different shaped members are used.

With this arrangement, if the portions of the current borne by the power supply units 22a and 22b becomes unequal, for example, when the current supplied by the inverter 24a becomes larger than the current supplied by the inverter 24b, the energy provided by the increased current is absorbed temporarily by the reactor 34a. Then, as described above, the first comparator 50a operates to stop the inverter 24a, whereby the inverter 24b bears a larger proportion of current, and the currents from the power supply units 22a and 22b are balanced.

Figure 3:
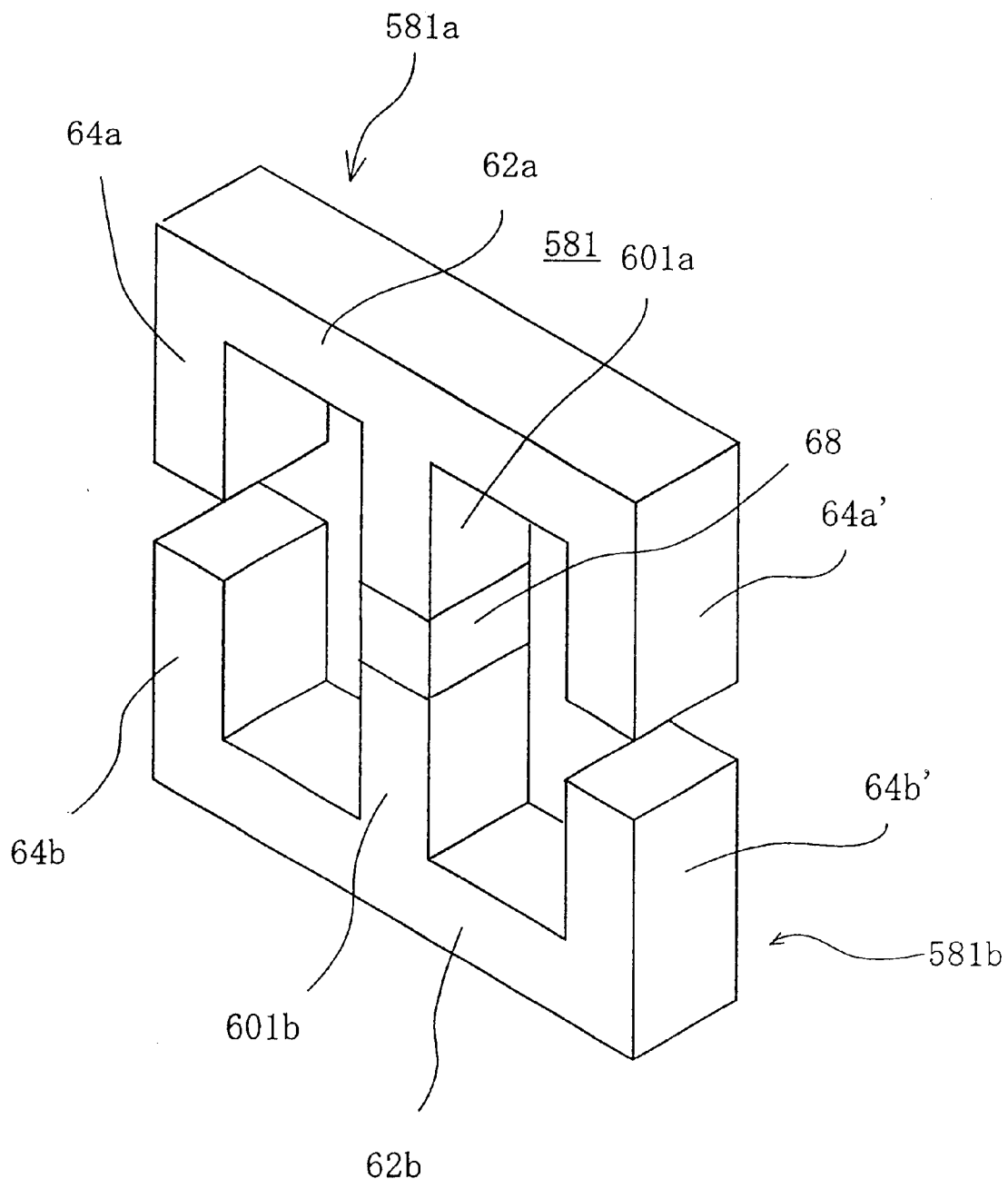
FIG. 3 is a perspective view of a core used in a modification of the reactor shown in FIG. 2.

FIG. 3 shows a modification of the core on which windings of the reactors 34a and 34b are wound. The core 581 includes first and second core members 581a and 581b of the same shape and size. The core members 581a and 581b include center legs 601a and 601b, respectively, and outer legs 64a and 64a' and 64b and 64b'. Different from the core 58 shown in FIG. 2, the center legs 601a and 601b of the members 581a and 581b have the same length as the outer legs.

When the first and second core members 581a and 581b are combined to form the core 581, a third member, e.g. another core 68 having a shape of rectangular parallelepiped, is disposed between the end surfaces of the center legs 601a and 601b. This provides gaps between the facing end surfaces of the outer legs 64a and 64b and 64a' and 64b'. The remainder of the core 581 is the same as that of the core 58 shown in FIG. 2. Therefore, the same reference numerals are attached to similar components, and no further explanation about them is given.

With this arrangement, the first and second core members 581a and 581b can be cores which are used to form a plurality of reactors which need not be coupled loosely.

Figure 4A:
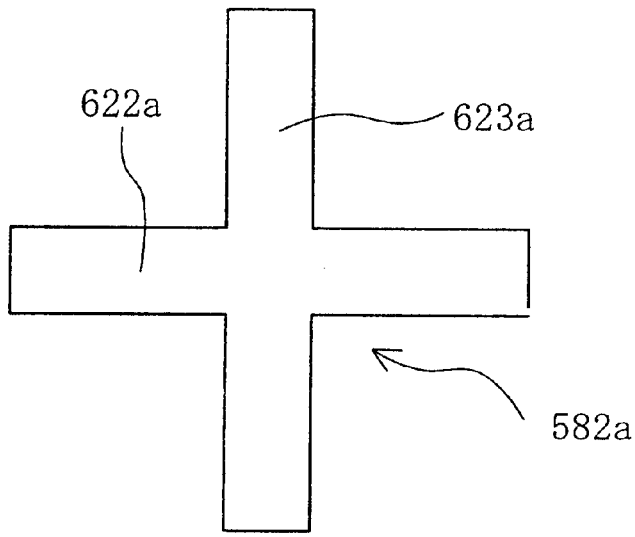
FIGS. 4A and 4B are a top plan view and a front elevational view of a core used in another modification of the reactor shown in FIG. 2.
Figure 4B:
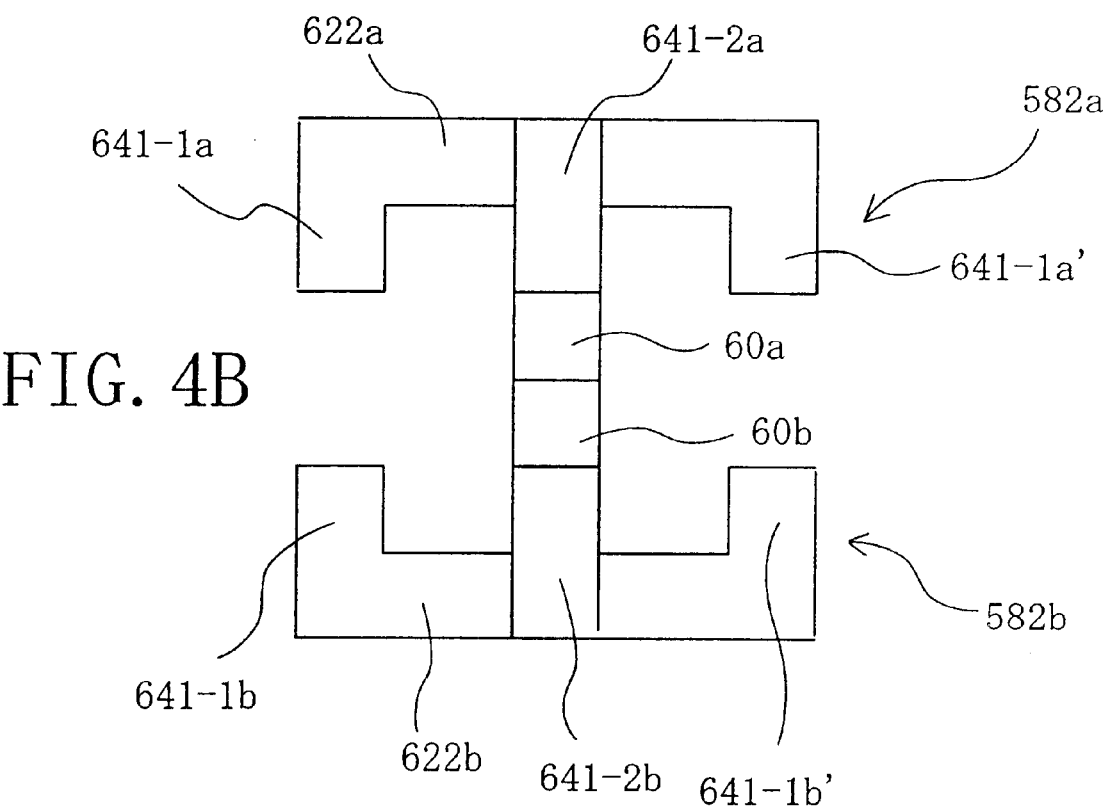

An even number greater than two, e.g. four, of power supply units may be connected in parallel. A core for use in such a case is shown in FIGS. 4A and 4B. As shown, the core 582 is formed of first and second core members 582a and 582b of the same shape and size. The core member 582a includes horizontally extending arms 622a and 623a orthogonally crossing each other, and a center leg 60a extending vertically from the crossing of the horizontal arms 622a and 623a, as shown in FIG. 4A. Outer legs 641-1a and 641-1a' extend vertically from opposite ends of the horizontal arm 622a in the same direction as the center leg 60a, and an outer leg 641-2a and another outer leg 641-2a' (not shown) extend vertically from opposite ends of the horizontal arm 623a in the same direction as the center leg 60a, as shown in FIG. 4B.

Similarly, the second core member 582b includes a horizontally extending arm 622b and another horizontally extending arm 623b (not shown) orthogonally crossing each other, and a center leg 60b extending vertically from the crossing of the horizontal arms 622b and 623b in the same direction as the center leg 60b. Outer legs 641-1b and 641-1b' extend vertically from opposite ends of the horizontal arm 622b, and an outer leg 641-2b and another outer leg 641-2b' (not shown) extend vertically from opposite ends of the horizontal arm 623b in the same direction as the center leg 60b.

The center legs 60a and 60b have the same length, and the eight outer legs 641-1a, 641-1a', 641-2a, 641-2a', 641-1b, 641-1b', 641-2b and 641-2b' have the same length. The length of the outer legs is smaller than the length of the center legs. The first and second core members 582a and 582b are combined with each other in such a manner that the end surfaces of the center legs 60a and 60b abut against each other, with the end surfaces of the outer legs 641-1a and 641-1b, the end surfaces of the outer legs 641-1a' and 641-1b', the end surfaces of the outer legs 641-2a and 641-2b, and the end surfaces of the outer legs 641-2a' (not shown) and 641-2b' (not shown) facing each other. With this arrangement, a gap is formed between each pair of facing outer legs.

Windings are wound on portions of the respective pairs of facing outer legs including the gaps between them, to thereby provide four reactors which are coupled loosely with each other.

The length of the center legs 60a and 60b can be equal to the length of the outer legs 641-1a through 641-2b' with an additional core disposed between the end surfaces of the center legs 60a and 60b.

In the described example, a DC voltage is supplied from a single DC supply 20 to the power supply units 22a and 22b. However, each of the power supply units 22a and 22b may be provided with an AC-to-DC converter including an input rectifier and smoothing means, e.g. a smoothing capacitor. In such a case, a commercial AC voltage is applied to the respective AC-to-DC converters of the power supply units for conversion to a DC voltage.

Also, in place of the inverters 24a and 24b, switching regulators formed of semiconductor switching devices may be used.

Further, in stead of detecting both the output current and the output voltage and controlling the inverters in such a manner as to make the detected output current and voltage become equal to the respective reference signals, either one of the output current and output voltage may be detected, and the inverters are controlled to make the detected current or voltage become equal to the reference value.

As described above, according to the present invention, the reactors can be downsized, which, in turn, makes it possible to produce a small-sized power supply apparatus with power supply units connected parallel. Also, because of the use of common control signals from a common control unit for controlling DC-to-high-frequency converters of the power supply units, it is easy to make the respective power supply units equally share output current.

What is claimed is:

1. A power supply apparatus comprising:
    at least two power supply units having their inputs connected to a DC supply supplying a DC voltage, and having their outputs connected in parallel to a load, each of said power supply units comprising:
        a DC-to-high-frequency converter receiving said DC voltage from said DC supply and converting the received DC voltage into a high-frequency voltage;
        a transformer for voltage-transforming said high-frequency voltage;
        a rectifier for rectifying an output voltage of said transformer; and
        a reactor for smoothing an output of said rectifier;
        said reactors of said power supply units being formed on a single core;
        said single core including a center part and at least two outer legs disposed on opposite sides of said center part, each of said outer legs extending along said center part and including a gap therein, windings of said reactors being wound in such a manner as to cover said gaps in said respective outer legs.

2. The power supply apparatus according to claim 1 wherein said gaps are formed in said outer legs at locations corresponding substantially to a mid portion along the length of said center part; and said core is formed of two members of same size and shape, said two members being disposed on opposite sides of a plane passing through said gaps and said center part.

3. The power supply apparatus according to claim 1 wherein said core comprises first, second and third members; each of said first and second members having a center leg, and at least two outer legs disposed on opposite sides of said center leg, being spaced from said center leg, said center legs having a same length, and said outer legs having a length same as said center legs; said first and second members being disposed in such a manner that said outer legs of one member can face corresponding outer legs of the other member; said third member being disposed between the center legs of said first and second members so that gaps can be disposed between said facing outer legs.

4. The power supply apparatus according to claim 1 further comprising a control unit common to said at least two power supply units, said control unit controlling said DC-to-high-frequency converters by a common control signal.

5. The power supply apparatus according to claim 4 wherein said common control unit comprises detecting means for detecting an output signal supplied to said load; error detecting means for developing an error signal representative of a difference between said output signal and a predetermined reference signal; and a control signal generating means for generating said common control signal based on said error signal.

* * * * *